(12) United States Patent
Kim et al.

(10) Patent No.: US 10,291,797 B2
(45) Date of Patent: May 14, 2019

(54) IMAGE SCANNING APPARATUS TO DETERMINE WHETHER A SECOND SCAN IMAGE IS A DUPLICATE IMAGE OF A FIRST SCAN IMAGE AND CONTROLLING METHOD THEREOF

(71) Applicant: HP PRINTING KOREA CO., LTD., Suwon-si, Gyeonggi-Do (KR)

(72) Inventors: Ki-hun Kim, Suwon-si (KR); Sang-hyun Park, Suwon-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 52 days.

(21) Appl. No.: 15/588,826

(22) Filed: May 8, 2017

(65) Prior Publication Data

US 2017/0339290 A1 Nov. 23, 2017

(30) Foreign Application Priority Data

May 20, 2016 (KR) ........................ 10-2016-0062017

(51) Int. Cl.
*H04N 1/00* (2006.01)
*H04N 1/387* (2006.01)

(52) U.S. Cl.
CPC ..... *H04N 1/00336* (2013.01); *H04N 1/00037* (2013.01); *H04N 1/00076* (2013.01); *H04N 1/3876* (2013.01); *H04N 2201/0081* (2013.01)

(58) Field of Classification Search
CPC .......... H04N 1/00336; H04N 1/00076; H04N 1/3876; H04N 1/00037; H04N 2201/0081
See application file for complete search history.

(56) References Cited

U.S. PATENT DOCUMENTS

| | | | | |
|---|---|---|---|---|
| 6,137,588 | A * | 10/2000 | Deen | G06K 15/00 347/3 |
| 2006/0268361 | A1 | 11/2006 | Krolczyk | |
| 2015/0358525 | A1 * | 12/2015 | Lord | G06F 17/30244 358/473 |
| 2016/0191741 | A1 * | 6/2016 | Tsukimori | H04N 1/17 358/486 |

FOREIGN PATENT DOCUMENTS

| | | |
|---|---|---|
| JP | 8-212287 | 8/1996 |
| JP | 2013-250725 | 12/2013 |
| KR | 10-0385070 | 5/2003 |
| KR | 10-2005-0048733 | 5/2005 |
| KR | 10-2007-0076761 | 7/2007 |

* cited by examiner

*Primary Examiner* — Christopher Wait
(74) *Attorney, Agent, or Firm* — Staas & Halsey LLP

(57) ABSTRACT

An image scanning apparatus includes a display unit, a scan unit configured to continuously generate a first scan image and a second scan image, and a processor configured to compare the generated first scan image and second scan image and determine whether the first scan image and the second scan image are scan images with respect to the a same original, and in response to determining that the first scan image and the second scan image are scan images with respect to a same original, control the display unit to display a notification message.

20 Claims, 9 Drawing Sheets

IMAGE SCANNING APPARATUS TO DETERMINE WHETHER A SECOND SCAN IMAGE IS A DUPLICATE IMAGE OF A FIRST SCAN IMAGE AND CONTROLLING METHOD THEREOF

CROSS-REFERENCE TO RELATED APPLICATIONS

This application is based on and claims priority under 35 U.S.C. § 119 to Korean Patent Application No. 10-2016-0062017, filed in the Korean Intellectual Property Office on May 20, 2016, the disclosure of which is incorporated by reference herein in its entirety.

BACKGROUND

1. Field

Apparatuses and methods consistent with exemplary embodiments relate to an image scanning apparatus and a controlling method thereof, and more particularly, to an image scanning apparatus capable of preventing a same original from being scanned again against a user's intention.

2. Description of the Related Art

The image scanning apparatus is an apparatus that scans an original image such as a document, a picture, a film, a card, and converts the original image into digital data. The image scanning apparatus may provide a function of copying/scanning the front and back sides of an ID card such as an ID card and a business card to print on one sheet of paper or to generate a single scan image.

However, the conventional image scanning apparatus does not provide a function of notifying the user when the same face of the ID card is scanned twice. Accordingly, when the same face of the ID card is scanned twice due to the user's error or the error of the image scanning apparatus, the user can recognize that the same face has been scanned twice only after receiving the scan result. In this case, the conventional image scanning apparatus has a problem that the user is forced to perform all the copy/scan operations for the front/back surface again.

In addition, since the ID card includes personal information, sensitive information, and the like, there is a problem that the user is inconvenienced to destroy erroneously-scanned or printed result.

SUMMARY

One or more exemplary embodiments provide an image scanning apparatus which determines whether the same original is scanned twice and provides a notification message to the user based on a comparison result with respect to scanned images and a state of the image scanning apparatus, and a controlling method thereof.

According to an aspect of an exemplary embodiment, there is provided an image scanning apparatus including: a display unit; and a scan unit configured to continuously generate a first scan image and a second scan image; and a processor configured to compare the generated first scan image and second scan image and determine whether the first scan image and the second scan image are scan images with respect to a same original, and in response to determining that the first scan image and the second scan image are scan images with respect to a same original, control the display to display a notification message.

According to an aspect of another exemplary embodiment, there is provided a controlling method of an image scanning apparatus, the method including: continuously generating a first scan image and a second scan image; determining whether the first scan image and the second scan image are scan images with respect to a same original by comparing the generated first scan image and the second scan image; and in response to determining that the first scan image and the second scan image are scan images with respect to a same original, displaying a notification message.

According to the various example embodiments of the present disclosure as described above, the present disclosure is capable of determining whether the user's document placement is appropriate before the final scan/print and informing the user of a result, and thereby the inconvenience of the user performing the scan job in the case of erroneous scanning/printing may be prevented.

BRIEF DESCRIPTION OF THE DRAWINGS

The above and other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which.

DETAILED DESCRIPTION

Hereinafter, preferred embodiments of the present disclosure will be described in detail with reference to the accompanying drawings. For reference, when it is determined that the detailed description of the known function or configuration may obscure the gist of the embodiments in describing them, the detailed description thereof will be omitted. Among the terms used herein, those that are defined in the dictionaries may be interpreted based on the same or similar definitions that can be understood in the associated technical context, and unless specifically defined otherwise, these are not interpreted as ideal or unnecessarily formal ways. Therefore, the terms used in the exemplary embodiments should be defined based on the meaning thereof and the descriptions of the present disclosure, rather than based on their names only.

The term such as "first" and "second" used in various example embodiments may modify various elements regardless of an order and/or importance of the corresponding elements, and does not limit the corresponding elements. In embodiments of the present disclosure, relational terms such as first and second, and the like, may be used to distinguish one entity from another entity, without necessarily implying any actual relationship or order between such entities. For example, a first element may be named a second element without departing from the scope of right of various example embodiments, and similarly, a second element may be named a first element. The term of and/or includes combination or one of a plurality of related items recited.

The terms used in the following description are provided to explain example embodiments and are not intended to limit the scope. It is to be understood that the singular forms "a," "an," and "the" include plural referents unless the context clearly dictates otherwise. The terms, "include", "have", etc. of the description are used to indicate that there are features, numbers, steps, operations, elements, parts or combination thereof, and they should not exclude the possibilities of combination or addition of one or more features, numbers, steps, operations, elements, parts or combination thereof.

Figure 1:
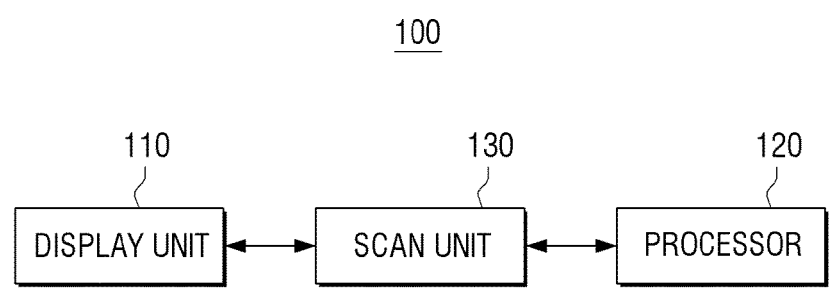
FIG. 1 is a schematic block diagram for explaining a configuration of an image scanning apparatus according to an example embodiment of the present disclosure.

FIG. 1 is a schematic block diagram for explaining a configuration of an image scanning apparatus 100 according to an example embodiment of the present disclosure. The image scanning apparatus 100 may scan an original and generate a scan image. For example, the image scanning apparatus 100 may be implemented as a scanner, a copy machine, a facsimile, or a multi-function peripheral (MFP) in which the above functions are combined and implemented on one apparatus.

Referring to FIG. 1, the image scanning apparatus 100 may include a display unit 110, a scan unit 120, and a processor 130.

The display unit 110 may display various information provided in the image scanning apparatus 100. Specifically, the display unit 110 may display a user interface window for selecting various functions provided in the image scanning apparatus 100. For example, the user interface window may include a guide message, a notification message, a function setting menu, a correction setting menu, an operation execution button, and the like. The display unit 110 may be implemented in various forms, such as liquid crystal display (LCD), organic light emitting diodes (OLED), an active-matrix organic light-emitting diode (AM-OLED), a plasma display panel (PDP), and the like.

The display unit 110 may be implemented as a touch screen form forming a mutual layer structure with a touch pad, and the touch screen may be configured to detect a touch input position, area, and a pressure of a touch input. In this case, the display unit 110 may further perform a function of an operation input unit (not illustrated) which will be described later.

The operation input unit (not illustrated) may receive an input of user's function selection and a control command for the corresponding function. The function may include printing, copying, scanning, fax transmission, and the like. The operation input unit (not illustrated) may receive a control command through a user interface window displayed on the display unit (110).

The scan unit 120 may scan an original and generate a scan image. Specifically, the scanner 120 may include a light emitter (not shown) emitting light to the manuscript and a lens (not shown) imaging light reflected from the manuscript to an internal image sensor, an image sensor, and the like, and read image information of the manuscript from the light imaged to the image sensor. For example, the image sensor may be implemented as a charge coupled device (CCD) and a CMOS image sensor (CIS).

The scan unit 120 may be a configuration which scans an original placed on a flatbed, and may be a configuration which scans one side or both sides fed by direct automatic document feeder (DADF).

The scan unit 120 may continuously generate a first scan image and a second scan image. For example, the scan unit 120 may generate a first scan image according to a scan command, and generate a second scan image in response to receiving a scan command again. In addition, the first scan image and the second scan image generated in the scan unit 120 may be combined to generate a single scan image. As another example, the scan unit 120 may generate a scan image with respect to each of originals fed continuously. In response to a plurality of originals being fed through the DADF, the scan unit 120 may generate the number of scan images corresponding to the number of originals being fed.

The processor 130 may control the overall operation of the image scanning apparatus 100. In particular, the processor 130 may compare the generated first scan image and second scan image to determine whether they are duplicated scan images with respect to the same original. In addition, in response to determining that they are scan images with respect to the same original, the processor 130 may control the display unit 110 to display a notification message.

According to an example embodiment of the present disclosure, the processor 130 may acquire characteristic information from each of the first scan image and the second scan image. In addition, the processor 130 may compare the acquired characteristic information to determine whether the first scan image and the second scan image are scan images with respect to the same original. For example, the characteristic information may be at least one of alpha channel information, edge information, segment information and text information. In addition, the characteristic information may be generated in the process of processing a scan image.

According to another example embodiment of the present disclosure, the processor 130 may detect an open/close operation of the cover unit 150 to determine whether scanning is performed with respect to the same original. A specific operation for determining whether scanning is performed with respect to the same original based on an open/close state of the cover unit 150 will be described again later.

According to another example embodiment, the processor 130 may determine an open/close state of the cover unit when a first scan image is scanned to determine whether to determine it is a scan image with respect to the same original based on characteristic information or to determine it is a scan image with respect to the same original based on the open/close state of the cover unit 150. As another example, the processor 130 may also determine both the characteristic information and the open/close state of the cover unit 150 to determine whether it is a scan image with respect to the same original.

According to the various example embodiments of the present disclosure as mentioned above, the image scanning apparatus 100 may provide a function of identifying whether the user properly places the original, and prevent a wrong scan/print result from being output in advance.

For example, in response to a front face of an ID card being scanned and then, the front side is scanned again, the image scanning apparatus 100 may provide a notification message to the user to scan a rear side. In addition, since the process of scanning the front side of the ID card is not restarted but only the back side needs to be scanned again, the image scanning apparatus 100 may provide convenience to a user.

Figure 2:
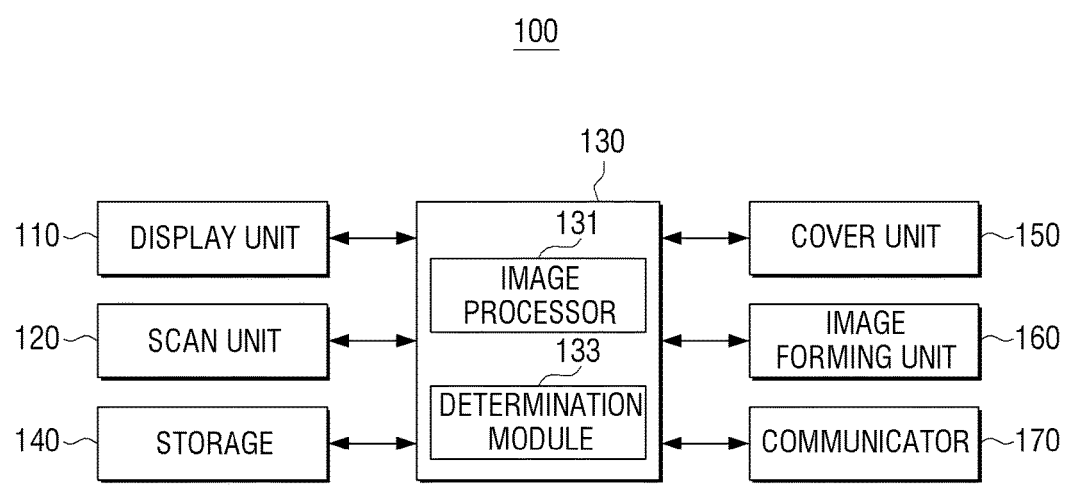
FIG. 2 is a block diagram for explaining a configuration of an image scanning apparatus in detail, according to an example embodiment of the present disclosure.

FIG. 2 is a block diagram for explaining a detailed configuration of an image scanning apparatus 100 according to an example embodiment. Referring to FIG. 2, the image scanning apparatus may include a display unit 110, a scan unit 120, a processor 130, a storage 140, a cover unit 150, an image forming unit 160, and a communicator 170.

However, the image scanning apparatus 100 according to an example embodiment of the present disclosure is not limited to including all of the features mentioned above. For example, the image scanning apparatus 100 according to an example embodiment of the present disclosure may be implemented not to include the image forming unit 160 or the communicator 170. In addition, the image scanning apparatus 100 may also further include a feature not illustrated in the example embodiment of FIG. 2. For example, the image scanning apparatus 100 may further include a feature such as an operation input unit (not illustrated), or the like.

The description of the display unit 110 and the scan unit 120 overlaps with the example embodiment of FIG. 1 and thus will be omitted.

The storage 140 may store various data, such as an operating system (OS), various programs, user setting data, and the like. In particular, the storage 140 may store a scanned scan image, and store various characteristic information of the scan image. For example, the characteristic information may be stored in not only a separate storage 140 but also an internal memory of the processor 130.

The storage 140 may be implemented as a storage medium inside the image scanning apparatus 100 or an external storage medium. The examples of an external storage medium include a removable disk including a USB memory, a storage medium connected to a host device of the image scanning apparatus, and a web server connected via network.

The cover unit 150 covers the top plate of the scan unit 120. The cover unit 150 may also include a feature such as auto document feeder (ADF). In addition, the cover unit 150 may include a sensor 180 disposed in a position in contact with the top plate of the scan unit 120. For example, the sensor 180 may be implemented as an illuminance sensor, an image sensor, a proximity sensor, or the like, to detect an operation state of the cover unit 150.

In the example embodiment of FIG. 2, it is illustrated that the cover unit 150 and the scan unit 120 are separate features. However, the example embodiment where the cover unit 150 is included as a part of the scan unit 120 is also possible.

The processor 130 may determine whether the cover unit 150 is open or closed based on a signal detected in the sensor 180. The cover unit may include a single sensor, but may include a plurality of sensors as well. For example, the processor 130 may determine a half-closed state of the cover unit 150 as well as an open/close state using a first sensor disposed on one end of the cover unit 150 and a second sensor 183 disposed on the other end of the cover unit 150. As another example, the sensor 180 may be disposed on the top plate of the scan unit 120, not the top plate of the cover unit 150.

The image forming unit 160 may output the generated scan image. Specifically, the image forming unit 160 may parse print data with respect to a scan image stored in the storage 140, render the print data, and print the rendered print data on a printing paper. The image forming unit 160 may print not only the generated scan image but also a file pre-stored in the storage 140 or a file received from an external apparatus.

The communicator 170 may communicate with an external apparatus, such as a host device, a web server, and the like, through wired or wireless network. For example, the communicator 170 may transmit the generated scan image to a web server.

The communicator 170 may use various methods, such as near field communication (NFC), wireless LAN, InfraRed (IR) communication, ZigBee communication, Wi-Fi, Bluetooth, and the like, as a wireless communication method. In addition, the communicator 170 may also use a mobile communication method (for example, GSM, UMTS, LTE, LTE-A, WIBRO, and the like). In addition, the communicator 170 may use various methods, such as high definition multimedia interface (HDMI), low voltage differential signaling (LVDS), local area network (LAN), universal serial bus (USB), and the like, as a wired communication method.

The processor 130 may control the remaining features of the image scanning apparatus 100. For example, the processor 130 may control the display unit 110 to display a notification message. The processor 130 may be implemented as a single CPU to perform all of image processing, an operation of determining whether images are the same scanned images, and an operation of controlling the other features, and may also be implemented as a plurality of processors, such as CPU, GPU, image signal processor (ISP), and the like, and an IP which performs a specific function.

In the example embodiment of FIG. 2, the processor 130 may include an image processor 130 and a determination module 133. For example, the image processor 131 may be implemented as an ISP, and the determination module 133 may implemented as an IP or a CPU. However, as described above, the processor 130 may also be implemented as a single chip which performs operations of both the image processor 131 and the determination module 133. Hereinafter, the operations of the image processor 131 and the determination module 133 will be described separately for the convenience of explanation.

The image processor 131 may correct a scan image generated in the scan unit 120. In addition, the image processor 131 may store information on an alpha channel generated in the correction process in the storage 140. For example, the alpha channel information may include at least one of edge information, segment information and text information of the image.

In addition, the image processor 131 may generate an edge map of a scan image generated in the scan unit 120. For example, the image processor 131 may generate an edge map using various algorithm schemes, such as flood fill, normalized cut, graph cut, and the like. In addition, the image processor 131 may acquire edge information and segment information from the edge map. The image processor 131 may store the acquired edge information and segment information in the storage 140.

Based on the alpha scan information stored in the storage 140 and the information acquired from the edge map, the determination module 133 may determine whether the first scan image and the second scan image are images with respect to the same original.

As another example, the determination module 133 may determine whether the first scan image and the second image are images with respect to the same original based on information on an open/close state of the cover unit 150. The determination module 133 may determine an open/close state of the cover unit 150 at the time when the first scan image is scanned using information detected in the sensor 180 disposed in the cover unit 150 or the scan unit 120.

If it is determined that the cover unit 150 is closed at the time when the first scan image is scanned and there is an operation of opening and closing the cover unit 150 prior to generating the second scan image, the determination module 133 may determine that the first scan image and the second scan image are images with respect to different originals. This is because the determination module 133 may determine that the user performs an operation of reversing the ID card or the user performs an operation of replacing the original when the user opens and closes the cover unit 150.

Hereinafter, the operation of the image scanning apparatus 100 will be briefly described with reference to FIGS. 3A-3C. In addition, various example embodiments of the present disclosure will be described using the flowcharts of FIGS. 4-7.

Figure 3A:
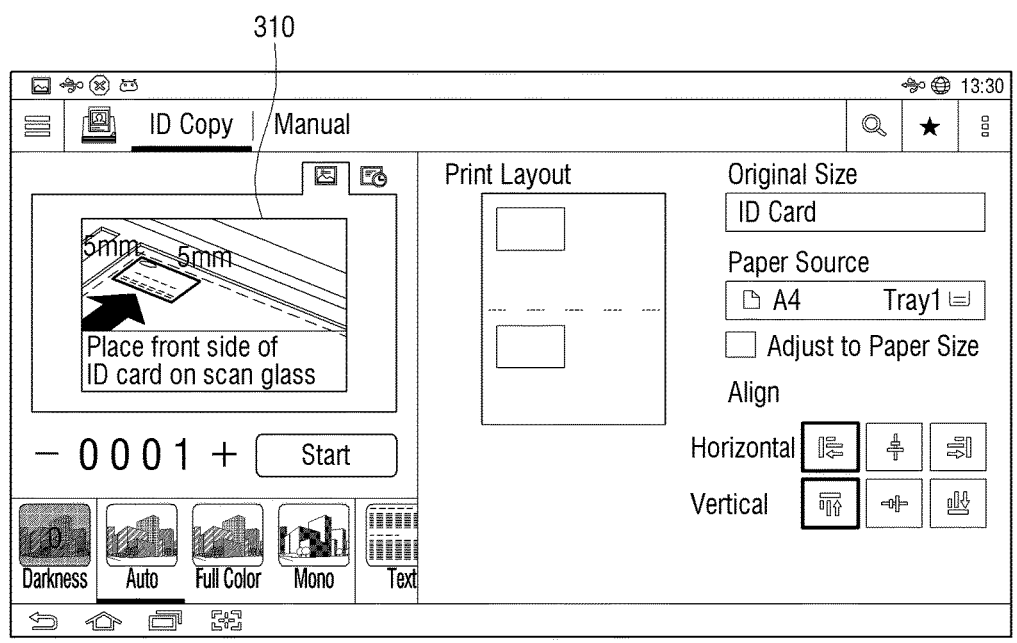
FIGS. 3A-3C are views for explaining a UI provided in an image scanning apparatus according to an example embodiment of the present disclosure.
Figure 3B:
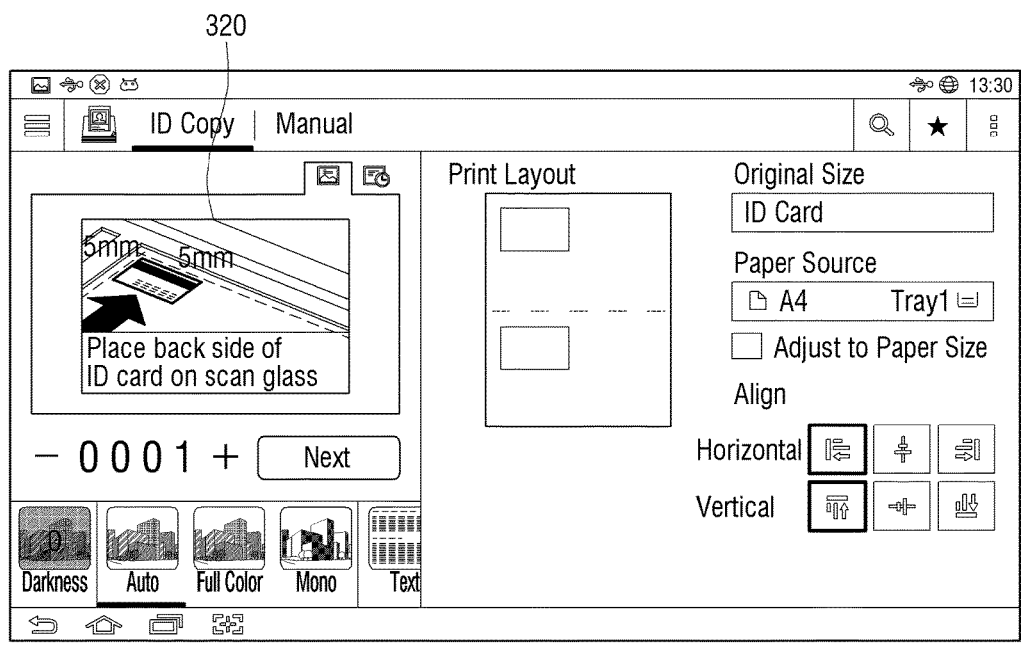
Figure 3C:
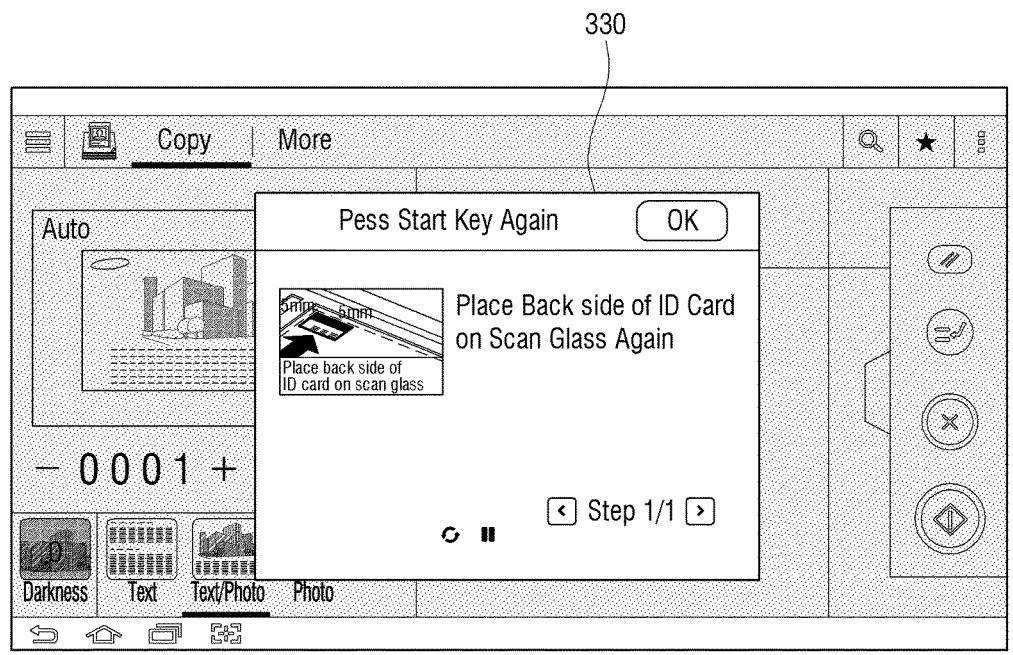

FIGS. 3A-3C are views illustrating a user interface window provided on the image scanning apparatus 100 according to an example embodiment of the present disclosure. FIGS. 3A-3C illustrate the case where the image scanning apparatus 100 scans front and rear sides of an ID card and generates a single scan image by combining scan images of the front and rear sides.

The controlling method of the image scanning apparatus 100 according to an example embodiment of the present disclosure may be applied to the case where a plurality of same originals are fed in the ADF other than an example embodiment of scanning an ID card and the case where a plurality of scan images are generated with respect to the same original due to a machine operation error. In other words, when it is determined that a scan of an image unintentionally due to a user's mistake or machine error has been made a plurality of times, the image scanning apparatus according to an example embodiment may provide a notification message to the user.

The processor 130 may control the display unit 110 to display a user interface window as illustrated in FIG. 3A before generating a first scan image (for example, a scan image with respect to a front side of an ID card). The user interface window may include a notification message window 310 which guides the front side of the ID card to be disposed on the top plate of the scan unit 120.

After the first scan image is generated, the processor 130 may control the display unit 110 to display a user interface window as illustrated in FIG. 3B before generating a second scan image (for example, a scan image with respect to a rear side of an ID card). The user interface window may include a notification message window 320 which guides the rear side of the ID card to be disposed on the top plate of the scan unit 120.

After the second scan image is generated, the processor 130 may determine whether the first scan image and the second scan image are scan images with respect to the same side of the ID card. Specific determination operation will be described with reference to FIGS. 4-7.

When it is determined that the first scan image and the second scan image are scan images with respect to the same side of the ID card (that is, when it is determined that both the first scan image and the second scan image are scan images with respect to the front side of the ID cards), the processor 130 may control the display unit 110 to display a notification message window 330 as illustrated in FIG. 3C. For example, the notification message window 300 may include a notification message to notify the user to place an original different from that of the first scan image in the scan unit 120.

In response to a scan start command of a user corresponding to indication of the notification message window 330 being received, the processor 130 may generate a third scan image. In addition, the processor 130 may determine whether the generated first scan image and third scan image are scan images with respect to the same side of the ID card.

As another example, a scan start command with respect to the third scan image may not be received after displaying of the notification message window 330, but may be received when a function of scanning/copying/printing the ID card is initially selected. Specifically, a function of scanning/copying/printing the ID card may be a function of scanning both the front side and rear side of the ID card and inserting scan images of the scanned front side and rear side of the ID card into a predetermined layout. According to an example embodiment of the present disclosure, the processor 130 may control to scan one side of an ID card and then, control a scanning process with respect to the other side of the ID card. Scanning of the other side of the ID card is completed when an image different from the first scan image is scanned. Thus, the processor 130 may generate a third scan image in response to a user command to initially select a function of scanning/copying/printing the ID card. For example, when the arrangement of the original, open/close of the cover unit 150, or the like, is detected, the processor 130 may generate a third scan image without additional scan start command after displaying of the notification message window 330.

When it is determined that the first scan image and the third scan image are scan images with respect to different sides of the ID card, the processor 130 may insert each of the first scan image and the third scan image into a predetermined layout to generate a combined image. As in an example illustrated in the center of FIGS. 3A and 3B, the predetermined layout may be a layout in which a position into which two scan images are respectively inserted is designated. In addition, the processor 130 may control the image forming unit 160 to print the generated combined image, or control the communicator 170 to transmit the generated combined image to an external apparatus. As another example, the processor 130 may simply combine the first scan image and the third scan image to generate a combined image.

FIGS. 4-7 are flowcharts for explaining a control method of another image scanning apparatus 100 according to various example embodiments of the present disclosure.

Figure 4:
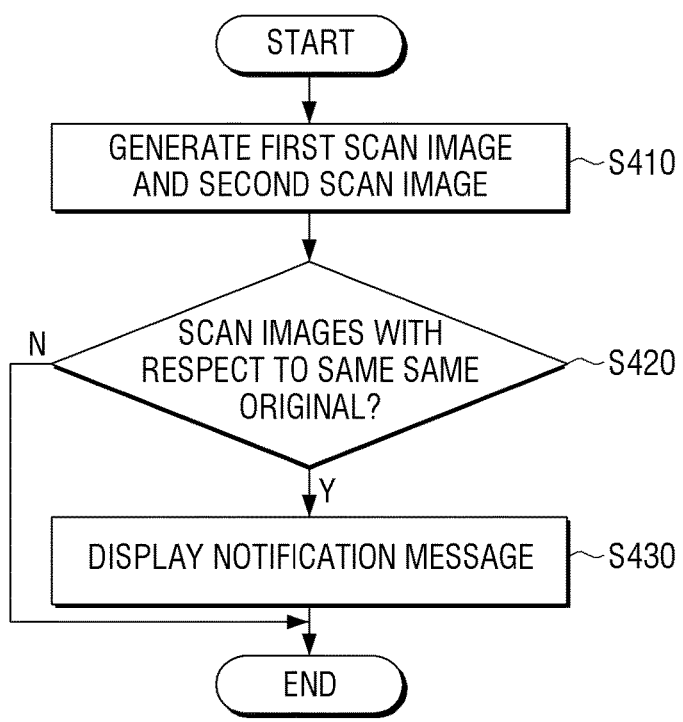
FIGS. 4-7 are flowcharts for explaining a control method of another image reading apparatus according to various example embodiments of the present disclosure.

Referring to FIG. 4, the image scanning apparatus 100 may continuously generate a first scan image and a second scan image, at operation S410. In addition, the image scanning apparatus 100 may compare the generated first scan image and second scan image to determine whether the images are scan images with respect to the same original, at operation S420. When it is determined that they are scan images with respect to different originals, S420—N, the image scanning apparatus 100 may end a scanning operation. Reversely, when it is determined that the first scan image and the second scan image are scan images with respect to the same original, S420—Y, the image scanning apparatus 100 may display a notification message, at operation S430.

The image scanning apparatus 100 may set the number of times a notification message is displayed. When the number of times the notification message is displayed exceeds a predetermined number of times, the image scanning apparatus 100 may determine that the images are scan images with respect to the same original, and, even if a condition for displaying a notification message is satisfied again, end the scanning operation without displaying a notification message. For example, when it is set to display a notification message up to three times, even if it is determined that a fourth scan image is a scan image with respect to the same original, the image scanning apparatus 100 may store/print/output the generated first scan image and second scan image.

As another example, the image scanning apparatus 100 may set a predetermined time. When the predetermined time is exceeded, the image scanning apparatus 100 may end a scanning operation. Specifically, the image scanning apparatus 100 may end the scanning operation unless a scan command is received, open/close of the cover unit is detected, disposition of the original is detected, or the like, after the predetermined time elapses.

As another example, the image scanning apparatus 100 may display a GUI including a selection menu to end the scanning operation together with a notification message. When a scan operation end command is received from a user through the GUI, the image scanning apparatus 100 may end the scanning operation irrespective of whether a condition for displaying a notification message is satisfied.

Figure 5:
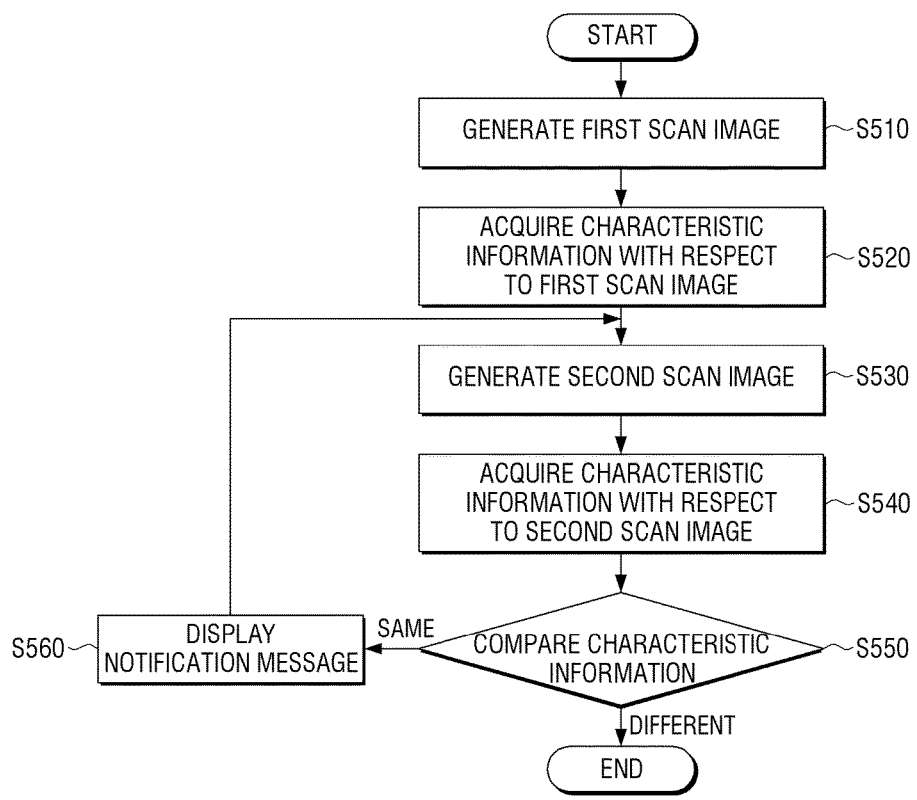

Referring to FIG. 5, the image scanning apparatus 100 may generate a first scan image, at operation S510. In addition, the image scanning apparatus 100 may acquire characteristic information with respect to the generated first scan image, at operation S520. For example, the characteristic information may be at least one of alpha channel information, edge information, segment information and text information.

The image scanning apparatus 100 may correct the generated first scan image. In addition, the image scanning apparatus 100 may store alpha channel information generated in the correction process. For example, the image scanning apparatus 100 may temporarily store the alpha channel information in a memory within the processor.

In addition, the image scanning apparatus may generate an edge map with respect to the generated first scan image. In addition, the image scanning apparatus 100 may acquire edge information and segment information of the first scan image from the generated edge map and store the same.

Subsequently, the image scanning apparatus 100 may generate a second scan image and acquire characteristic information, at operations S530 and S540. The steps of S530 and S540 correspond to the steps of S510 and S520 described above and thus, the description that overlaps will be omitted.

The image scanning apparatus 100 may compare the stored characteristic information with respect to the first scan image and the second scan image, at operation S550. By comparing the characteristic information, the image scanning apparatus 100 may determine whether the first scan image and the second scan image are scan images with respect to the same original.

If it is determined that the first scan image and the second scan image are scan images with respect to different originals, S550—different, the image scanning apparatus 100 may end the scanning operation. The image scanning operation 100 may subsequently combine the first scan image with the second scan image to generate a combined image, and perform an operation of storing/printing/transmitting the generated combined image.

Reversely, when it is determined that the first scan image and the second scan image are scan images with respect to the same original, S550—same, the image scanning apparatus 100 may display a notification message to notify a user that two scan images with respect to the same original are generated. For example, a notification message may be a message to place an original that is different from that of the first scan image. When a scan start command is received, the image scanning apparatus 100 may start from the step of generating a second scan image (operation S530). Therefore, the image scanning apparatus 100 may not perform an unnecessary operation to generate a first scan image again.

Figure 6:
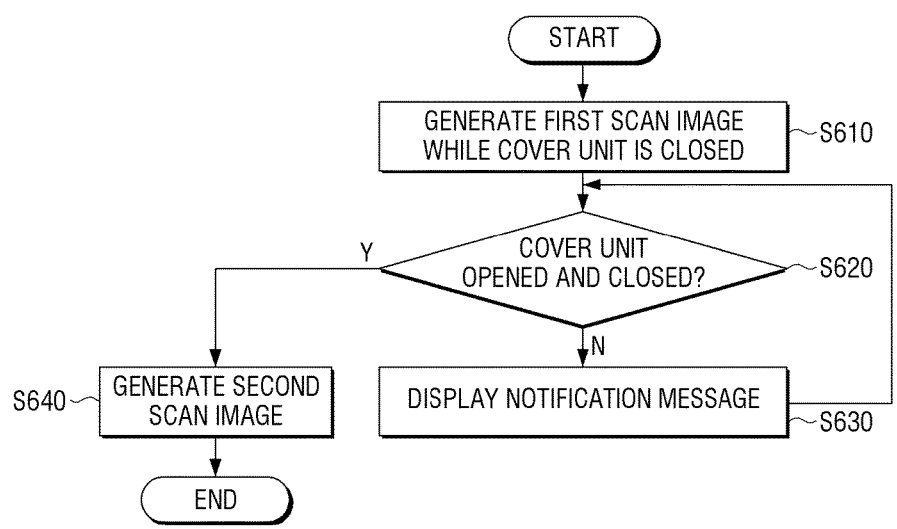

In the example embodiment of FIG. 6, the image scanning apparatus 100 may be implemented as a scanner of a flatbed type including a cover unit. The image scanning apparatus 100 may determine an open/close state of the cover unit when the first scan image is generated. In the example embodiment of FIG. 6, it will be limited to the case where it is determined that the cover unit is in a closed state when the first scan image is generated.

The image scanning apparatus 100 may generate a first scan image while the cover unit is closed, at operation S610. After the first scan image is generated, the image scanning apparatus 100 may determine whether a state change has occurred from opening and closing of the cover unit, at operation S620. For example, the image scanning apparatus 100 may determine whether an open/close operation of the cover unit is performed by using information detected by a sensor disposed in a portion where the cover unit and the scan unit are in contact with each other.

When the cover unit is opened and closed, S620—Y, the image scanning apparatus 100 may determine that the original with respect to the first scan image is removed and that the original of the second scan image different from that of the first scan image is disposed. Accordingly, the image scanning apparatus 100 may generate a second scan image without an operation such as displaying of a notification message, at operation S640.

Reversely, when it is not that the cover unit is opened and closed, S620—N, the image scanning apparatus 100 may determine that the original with respect to the first scan image is placed as it is. Accordingly, the image scanning apparatus 100 may display a notification message before performing an operation of generating a second scan image, at operation S630. In addition, the image scanning apparatus 100 may start from the step of determining whether an open/close operation of the cover unit is performed (S620).

Figure 7:
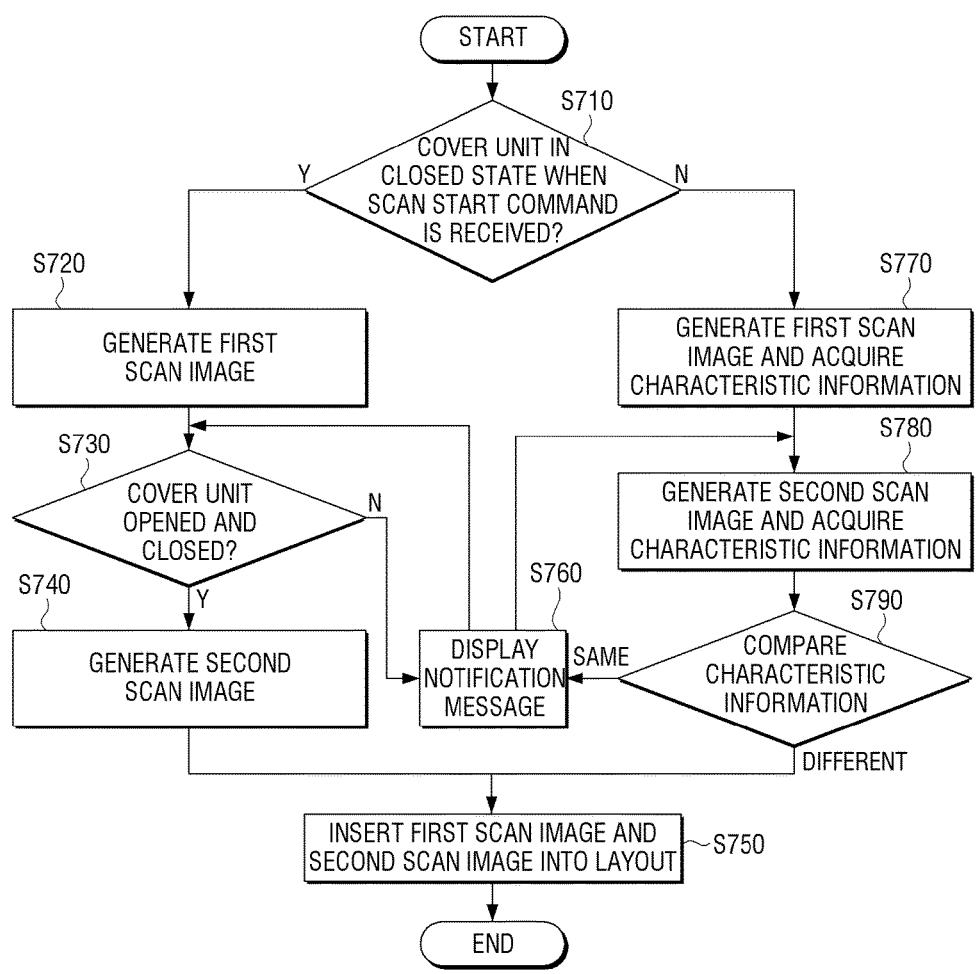

Referring to FIG. 7, the image scanning apparatus 100 may identify a state of the cover unit in response to a scan start command being received, at operation S710. In addition, the image scanning apparatus 100 may store the state of the cover unit. If it is determined that the cover unit is in a closed state, S710—Y, the image scanning apparatus 100 may determine whether the first scan image and the second scan image are scan images with respect to the same original based on an open/close state of the cover unit as in the example embodiment illustrated in FIG. 6. The steps of S720, S730, S740 and S760 correspond to the steps of S610, S620, S640 and S630, respectively. Thus, the redundant description is omitted herein.

Reversely, when the cover unit is not in a closed state, when a sensor capable of detecting a state of the cover unit is not provided, or when a cover unit itself is not present, S710—N, the image scanning apparatus 100 may determine whether the first scan image and the second scan image are scan images with respect to the same original based on characteristic information with respect to the first scan image and the second scan image. The step of S770 corresponds to the steps S510 and S520, and the step of S780 corresponds to the steps of S530 and S540. In addition, the steps of S790 and S760 correspond to the steps of S550 and S560, respectively. Thus, the redundant description is omitted herein.

Subsequently, the image scanning apparatus 100 may insert the first scan image and the second scan image, which are determined to be scan images with respect to different originals, into a predetermined layout. The image scanning apparatus 100 may insert the first scan image and the second scan image respectively into a specific position of the predetermined layout to generate a combined image. In addition, the image scanning apparatus 100 may print the generated combined image or transmit the generated combine image to an external apparatus.

According to the control method of the image scanning apparatus 100 according to another example embodiment of the present disclosure, even if it is determined that the cover unit is in a closed state at the time when the first scan image is generated, the image scanning apparatus 100 may compare characteristic information of the first scan image and the second scan image to determine whether the first scan image and the second scan image are scan images with respect to the same original. According to the above example embodiment, a state of the cover unit and characteristic information of the respective scan images may be considered, and thereby, the image scanning apparatus can perform more accurate determination.

According to the various example embodiments of the present disclosure as mentioned above, the image scanning apparatus 100 may provide a function of identifying whether the user properly places the original, and prevent a wrong scan/print result from being output in advance. In this respect, the image scanning apparatus 100 can improve the inconvenience that the erroneous scan/print result for the ID card including personal information should be discarded.

The methods according to one or more exemplary embodiments may be implemented as a program command type that may be performed through various computer units and may be recorded in a computer readable medium. The computer-readable medium may include a program command, a data file, a data structure or the like, alone or a combination thereof. The program commands recorded in the computer-readable medium may be designed for the exemplary embodiments or be known to those skilled in a field of computer software. Examples of computer-readable media include magnetic media such as hard disks, floppy disks, and magnetic tape; optical media such as CD-ROMs and DVDs; magnetic media such as floppy disks; Magneto-optical media, and hardware devices specifically configured to store and execute program instructions such as ROM, RAM, flash memory, and the like. The program commands may include not only machine codes which are made by a compiler, but also high-level language code which can be executed via computer by using interpreter. The hardware device may be configured to operate as one or more software modules. Conversely, software modules may be configured to operate as a hardware device.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. An image scanning apparatus, comprising:
a display;
a scanner to generate a first scan image and to selectively generate a second scan image;
a cover to cover the scanner; and
a processor:
to determine whether the cover is in a closed state or an open state before the first scan image and the second scan image are generated,
when the cover is determined to be in the open state, to compare the generated first scan image with the second scan image generated by the scanner and determine whether the generated second scan image is a duplicate image of the generated first scan image,
when the cover is determined to be in the closed state, to determine whether an open and close operation of the cover has occurred after the first scan image is generated while the cover is in the closed state and before the second scan image is generated,
in response to determining that the open and close operation has occurred, determine that the generated second scan image is not the duplicate image of the generated first scan image without comparing the generated first scan image with the generated second scan image, the second scan image being generated by the scanner after determining that the open and close operation has occurred, and
in response to determining that the generated second scan image is the duplicate image of the generated first scan image, when the cover is determined to be in the open state, control the display to display a notification message.

2. The apparatus as claimed in claim 1, wherein the processor is to acquire characteristic information from each of the generated first scan image and the generated second scan image, and compare the acquired characteristic information to determine whether the generated second scan image is the duplicate image of the generated first scan image.

3. The apparatus as claimed in claim 2, wherein the acquired characteristic information includes at least one of alpha channel information, edge information, segment information, or text information.

4. The apparatus as claimed in claim 2, further comprising:
a storage to store the generated first scan image, the generated second scan image, and the acquired characteristic information,
wherein the processor is to correct the first scan image and the second scan image, store alpha channel information that is generated in the correction process in the storage, generate an edge map of the first scan image and the second scan image, acquire edge information and segment information from the generated edge map, and store the acquired edge information and segment information in the storage as the acquired characteristic information.

5. The apparatus as claimed in claim 1, wherein
the scanner is a flatbed-type scanner which includes the cover, and
in response to determining that the open and close operation has not occurred, the scanner does not generate the second scan image and the processor is to control the display to display the notification message without comparing the generated first scan image.

6. The apparatus as claimed in claim 1, wherein
in response to determining that the open and close operation has not occurred, the scanner is to generate the second scan image, the processor is to compare the generated first scan image with the generated second scan image to determine whether the generated second scan image is the duplicate image of the generated first scan image, and the processor is to control the display to display the notification message in response to determining that the generated second scan image is the duplicate image of the generated first scan image.

7. The apparatus as claimed in claim 1, wherein the notification message includes a message to place a different original document in the scanner.

8. The apparatus as claimed in claim 1, wherein
the scanner is to generate a third scan image according to a scan command of a user after the notification message is displayed, and
the processor is to insert one of the generated first scan image and the generated second image into a predetermined layout, to insert the generated third scan image into the predetermined layout, and to generate a combined image.

9. The apparatus as claimed in claim 8, further comprising:
an image former to print the generated combined image.

10. The apparatus as claimed in claim 1, wherein the processor, in response to a number of times that the notification message is displayed exceeding a predetermined number, is to end a scanning operation without displaying the notification message even if a condition for displaying the notification message is satisfied again.

11. A controlling method of an image scanning apparatus, the method comprising:
determining, by the image scanning apparatus, whether a cover of the image scanning apparatus is in a closed state or an open state;
generating, by the image scanning apparatus, a first scan image after determining whether the cover of the image scanning apparatus is in the closed state or the open state;
when the cover is determined to be in the open state, generating a second scan image and determining, by the image scanning apparatus, whether the generated second scan image is a duplicate image of the generated first scan image by comparing the generated first scan image with the generated second scan image;
when the cover is determined to be in the closed state, determining, by the image scanning apparatus, whether an open and close operation of the cover has occurred after the first scan image is generated while the cover is in the closed state and before the second scan image is generated;
in response to determining that the open and close operation of the cover has occurred, determining that the generated second scan image is not the duplicate image of the generated first scan image without comparing the generated first scan image with the generated second scan image, the second scan image being generated after determining that the open and close operation has occurred; and
in response to determining that the generated second scan image is the duplicate image of the generated first scan image, displaying the notification message.

12. The method as claimed in claim 11, wherein the determining whether the generated second scan image is the duplicate image of the generated first scan image comprises:
acquiring characteristic information from each of the generated first scan image and the generated second scan image; and
determining whether the generated second scan image is the duplicate image of the generated first scan image by comparing the acquired characteristic information.

13. The method as claimed in claim 12, wherein the acquired characteristic information includes at least one of alpha channel information, edge information, segment information, or text information.

14. The method as claimed in claim 12, wherein the determining whether the generated second scan image is the duplicate image of the generated first scan image comprises:
correcting the first scan image and the second scan image;
storing alpha channel information that is generated in the correction process;
generating an edge map of the first scan image and the second scan image;
acquiring edge information and segment information from the generated edge map; and
storing the acquired edge information and segment information.

15. The method as claimed in claim 11, wherein
the image scanning apparatus includes a flat-bed scanner including the cover, and
in response to determining that the open and close operation has not occurred, not generating the second scan image and displaying the notification message without comparing the generated first scan image.

16. The method as claimed in claim 11, wherein:
in response to determining that the open and close operation of the cover has not occurred, generating the second scan image and determining whether the generated second scan image is the duplicate image of the generated first scan image by comparing the generated first scan image with the generated second scan image.

17. The method as claimed in claim 11, wherein the notification message includes a message to place a different original document in the image scanning apparatus.

18. The method as claimed in claim 11, further comprising:
generating a third scan image according to a scan command of a user after the notification message is displayed; and
inserting either the generated first scan image or the generated second scan image into a predetermined layout, inserting the generated third scan image into the predetermined layout, and generating a combined image.

19. The method as claimed in claim 18, further comprising:
printing the generated combined image.

20. The method as claimed in claim 11, wherein, in response to a number of times the notification message is displayed exceeding a predetermined number, ending a scanning operation without displaying the notification message even if a condition for displaying the notification message is satisfied again.

* * * * *

UNITED STATES PATENT AND TRADEMARK OFFICE
CERTIFICATE OF CORRECTION

PATENT NO. : 10,291,797 B2  
APPLICATION NO. : 15/588826  
DATED : May 14, 2019  
INVENTOR(S) : Ki-hun Kim et al.

Page 1 of 1

It is certified that error appears in the above-identified patent and that said Letters Patent is hereby corrected as shown below:

On the Title Page

In Column 2, item (57), Abstract, Line 6, delete "the a" and insert -- the --, therefor.

In the Drawings

In sheet 6 of 9, FIG. 4, reference numeral S420, Line 2, delete "SAME SAME" and insert -- SAME --, therefor.

Signed and Sealed this  
Thirteenth Day of August, 2019

Andrei Iancu  
*Director of the United States Patent and Trademark Office*